United States Patent
Lee (10) Patent No.: US 6,783,348 B2
(45) Date of Patent: Aug. 31, 2004

(54) EXTRUSION MOLDING APPARATUS FOR PRODUCT HAVING WOOD PATTERN AND EXTRUSION MOLDING METHOD THEREOF

(75) Inventor: Moon Jae Lee, Kyounggi-Do (KR)

(73) Assignees: Korea Plasys Corporation, Inchun-Si (KR); Moon Hae Lee, Kyounggi-Do (KR)

( * ) Notice: Subject to any disclaimer, the term of this patent is extended or adjusted under 35 U.S.C. 154(b) by 0 days.

(21) Appl. No.: 10/058,057

(22) Filed: Jan. 29, 2002

(65) Prior Publication Data

US 2003/0057591 A1 Mar. 27, 2003

(30) Foreign Application Priority Data

Sep. 26, 2001 (KR) .......................................... 2001-59553
Sep. 26, 2001 (KR) .......................................... 2001-59554

(51) Int. Cl.[7] .............................................. B29C 47/06
(52) U.S. Cl. .................................. 425/131.1; 425/133.1; 425/462
(58) Field of Search ........................... 425/133.1, 131.1, 425/113, 462, 467, 380, 38

(56) References Cited

U.S. PATENT DOCUMENTS

| | | | |
|---|---|---|---|
| 3,764,642 A | * 10/1973 | Boutillier ................... 264/45.5 |
| 4,254,812 A | 3/1981 | Roker et al. ................. 152/211 |
| 4,364,882 A | * 12/1982 | Doucet ...................... 264/45.9 |
| 4,383,812 A | * 5/1983 | Calcagni .................. 425/133.1 |
| 4,505,869 A | 3/1985 | Nishibori ..................... 264/115 |
| 5,053,176 A | * 10/1991 | Cameron et al. ............. 264/75 |
| 5,126,088 A | * 6/1992 | Andres ................... 264/173.17 |
| 5,232,751 A | * 8/1993 | Cameron et al. ............. 428/15 |
| 5,313,909 A | * 5/1994 | Tseng et al. ................ 116/208 |
| 5,324,187 A | * 6/1994 | Cook ....................... 425/131.1 |
| 5,516,472 A | * 5/1996 | Laver ......................... 264/118 |
| 5,672,303 A | * 9/1997 | Metzger et al. ............... 264/75 |
| 5,733,491 A | * 3/1998 | Grosset et al. ............ 264/172.1 |
| 6,276,915 B1 | * 8/2001 | Merziger et al. ......... 425/133.1 |

* cited by examiner

Primary Examiner—Robert Davis
Assistant Examiner—Joseph S. Del Sole
(74) Attorney, Agent, or Firm—McGuireWoods LLP (57) ABSTRACT

An extrusion molding apparatus for forming a product having an extrusion molding. The extrusion molding apparatus includes an extruder extruding the product through a die installed at an outlet of the extruder. A second inlet is formed at one side of the die to receive a second synthetic resin. A second extruder feeds the second synthetic resin into the second inlet and a passage in fluid communication with the second inlet. The passage transports the second synthetic resin to nozzle grooves formed in the die, thereby coating the second synthetic resin on a surface of the product extruded from the die having a first synthetic resin.

19 Claims, 7 Drawing Sheets

FIG 10

EXTRUSION MOLDING APPARATUS FOR PRODUCT HAVING WOOD PATTERN AND EXTRUSION MOLDING METHOD THEREOF

BACKGROUND OF THE INVENTION

1. Field of the Invention

The present invention relates to an extrusion molding apparatus and an extrusion molding method, and more particularly to an extrusion molding apparatus for a product having a wood pattern and an extrusion molding method thereof, in which a second synthetic resin containing a wood powder of 80~120 meshes at a predetermined ratio is fed to a die through a second extruder and then is coated on a surface of the product extruded from the die, thereby obtaining an esthetic surface and improving durability.

2. Discussion of the Related Art

Generally, extrusion molding is to successively manufacture products, such as pipes, rods, sheets, films, fibers, and coating cables, by extruding a thermoplastic synthetic resin, which has been heated and softened, from an extrusion die using an extruder.

A conventional extrusion molding apparatus is configured to wind or cut the product by placing a pellet shaped thermoplastic synthetic resin in a hopper, softening it with a screw in a heating cylinder, extruding it from the die, and cooling it. The conventional extrusion molding apparatus is characterized in that a softening resin is successively extruded with a screw. The products having various sections may be made depending on shapes of holes of an extrusion die at an outlet of an extruder. Such extrusion molding is widely used in accordance with the development of polymer compounds such as synthetic resin and has become a basis of mass production.

Among the products based on the above-described extrusion molding, there are the products having a constant section, such as a window frame and a doorframe. These products are on a high-grade trend to give an effect of raw lumber. If the product is manufactured using a general synthetic resin, it is likely that the product having a single color is manufactured. Therefore, the product coated with a film, such as sheet with a wood pattern, wood, and paper, to give an effect of raw lumber is recently coming out in the market.

However, the product coated with such a film has several problems. Since the film is made of a material and characteristics different from those of the product, the film and the product respectively have different shrinkage depending on temperature changes. In this case, a problem arises in that it is likely to take the film, such as sheet, wood, and paper, off the product as time passes.

SUMMARY OF THE INVENTION

Accordingly, the present invention is directed to an extrusion molding apparatus for a product having a wood pattern and an extrusion molding method that substantially obviates one or more of the problems due to limitations and disadvantages of the related art.

An object of the present invention is to provide an extrusion molding apparatus for a product having a wood pattern and an extrusion molding method, in which a second synthetic resin containing a wood powder of 80~120 meshes is coated on a surface of the product at different ratios.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, in an extrusion molding apparatus for successively producing a product having a wood pattern with a predetermined sectional shape by feeding a thermoplastic synthetic resin to an extruder and extruding the product through a die installed at an outlet of the extruder, it is characterized in that a second inlet is formed at one side of the die to fit a second synthetic resin thereinto, a second extruder which feeds the second synthetic resin is connected to the second inlet, and a second passage communicated with the second inlet of the die is formed to communicate with an original synthetic resin passage formed in the die, thereby coating the second synthetic resin on a surface of the product extruded from the die.

In another aspect of the present invention, an extrusion molding method for successively producing a product having a wood pattern with a predetermined sectional shape by feeding a thermoplastic synthetic resin to an extruder and extruding the product through a die installed at an outlet of the extruder, the extrusion molding method includes the steps of: forming a second passage in a synthetic resin passage in the die to communicate with the synthetic resin passage; and connecting a second extruder to the second passage so that the second synthetic resin is coated on a surface of the product extruded from the die.

In other aspect of the present invention, in an extrusion molding die for a product having a wood pattern, provided with a thermoplastic synthetic resin and a synthetic resin passage, the thermoplastic synthetic resin being installed at an outlet of an extruder so that it is to be fed to the extruder and then extruded in the product having a predetermined sectional shape such as the synthetic resin passage, a second inlet is formed at one side of the die to fed a second synthetic resin thereto, and the second inlet is formed to communicate with a second passage communicated with the synthetic resin passage of the die so that the second synthetic resin is coated on a surface of the product extruded from the die.

It is to be understood that both the foregoing general description and the following detailed description are exemplary and explanatory and are intended to provide further explanation of the invention as claimed.

BRIEF DESCRIPTION OF THE ATTACHED DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
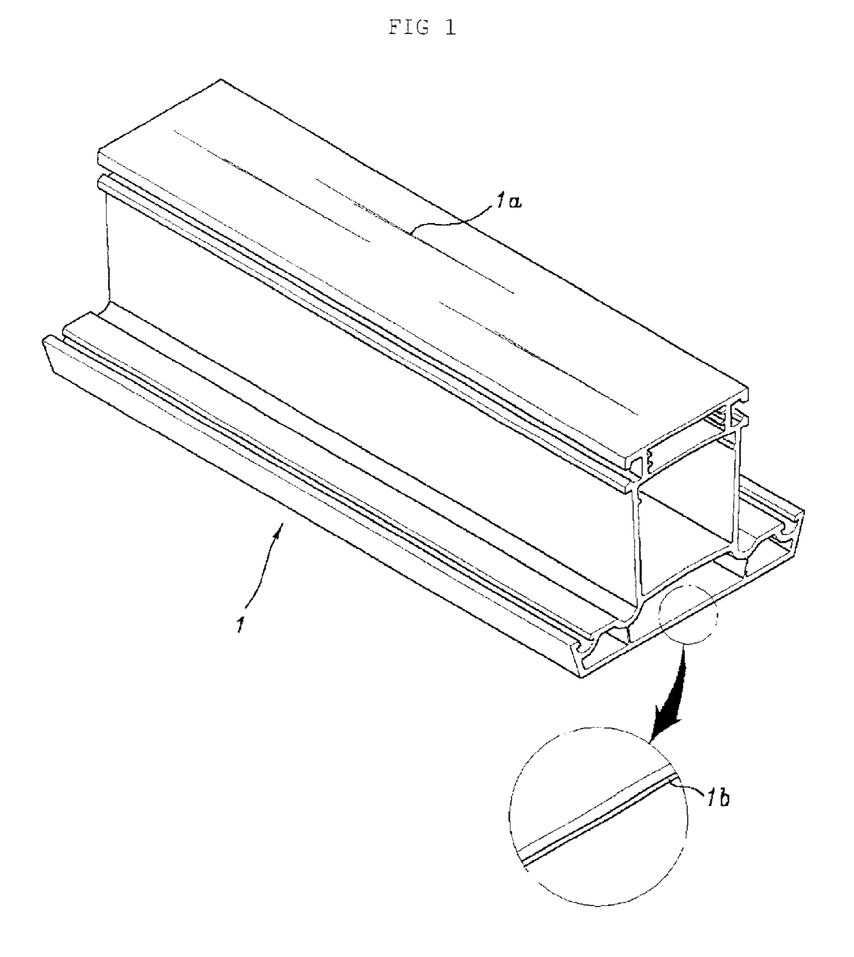
FIG. 1 is a perspective view of a product manufactured by an extrusion molding method according to the present invention.

An extrusion molding product 1 according to the present invention, as shown in FIG. 1, is configured such that an original synthetic resin is coated with a second synthetic resin 1b. The second synthetic resin 1b contains a wood powder of 80~120 meshes and is coated on a surface of the original synthetic resin at different ratios so that a wood pattern 1a is formed.

Figure 2:
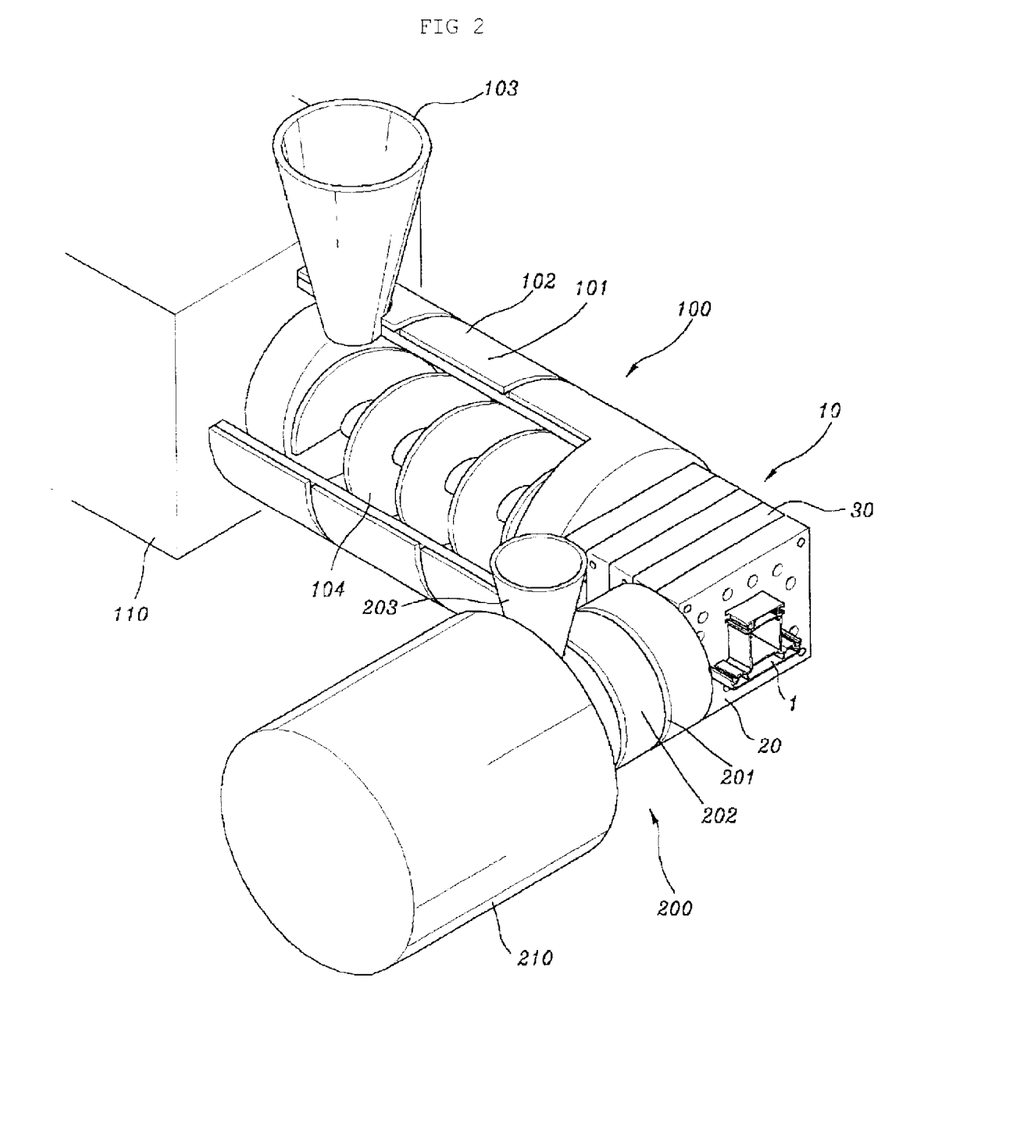
FIG. 2 is a perspective view of an extrusion molding apparatus according to the present invention.
Figure 3:
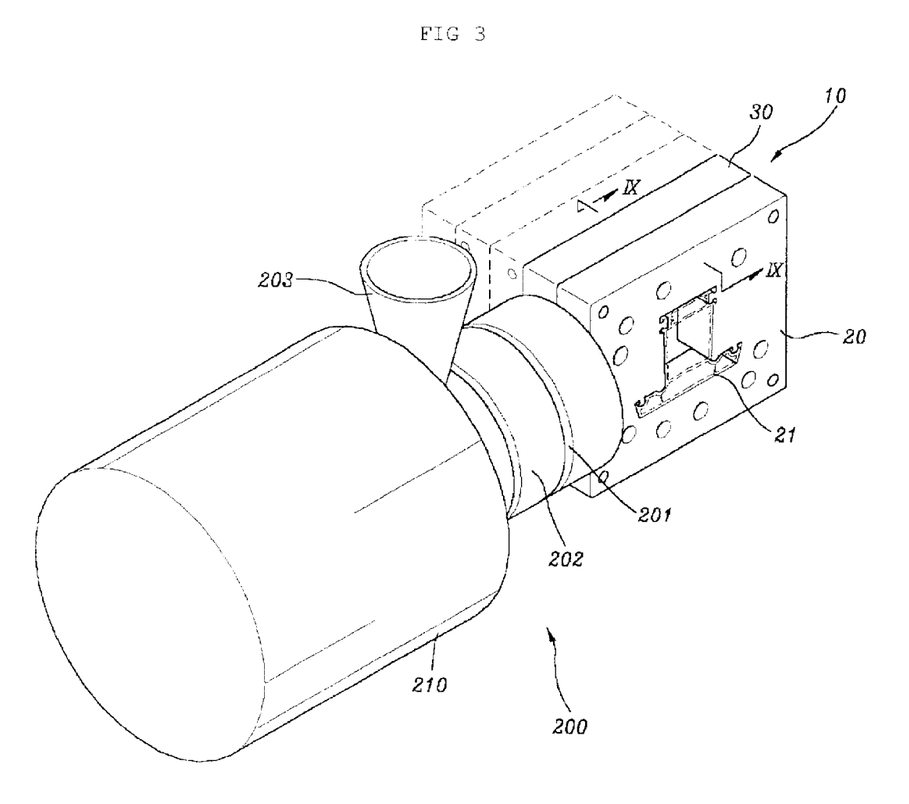
FIG. 3 is a perspective view of a second extruder in an extrusion molding apparatus according to the present invention.
Figure 4:
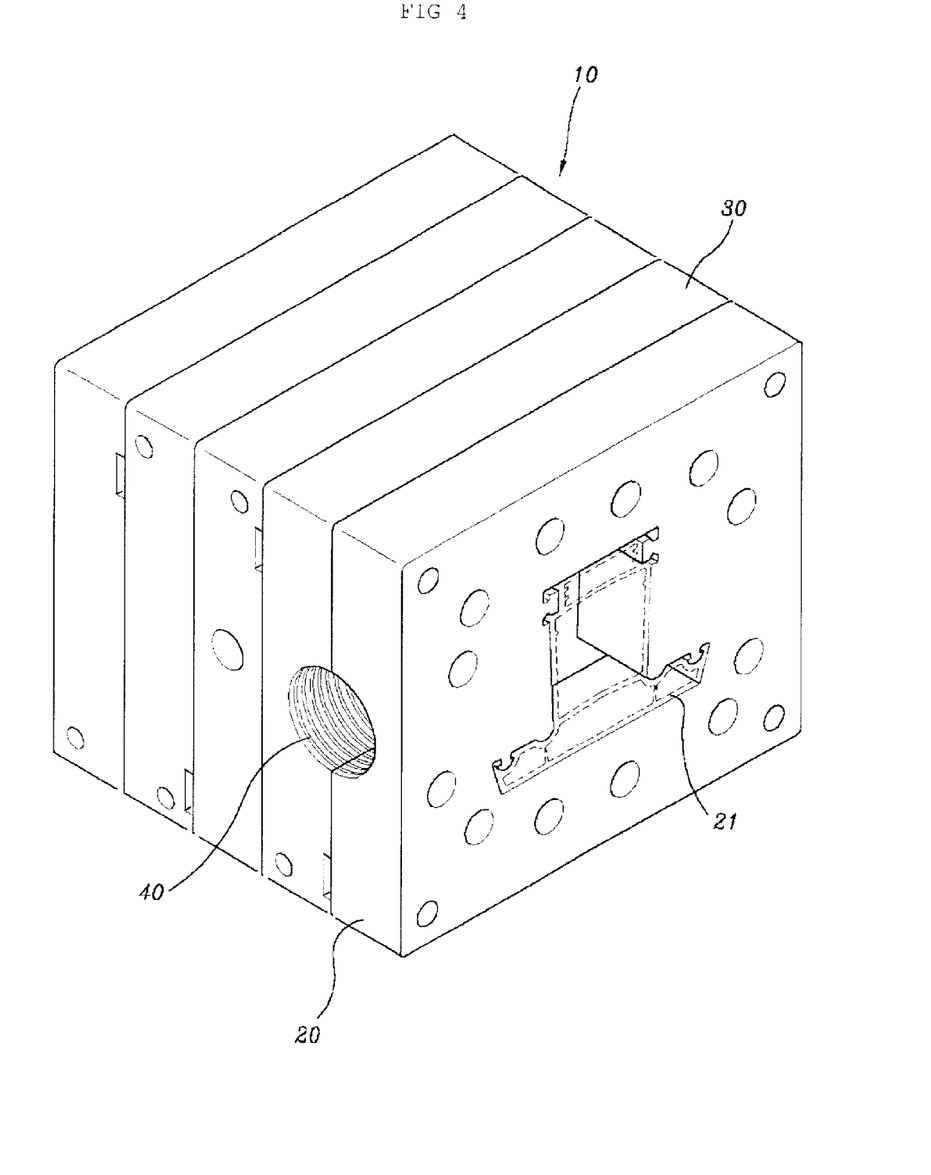
FIG. 4 is a perspective view of an extrusion molding die according to the present invention.
Figure 5:
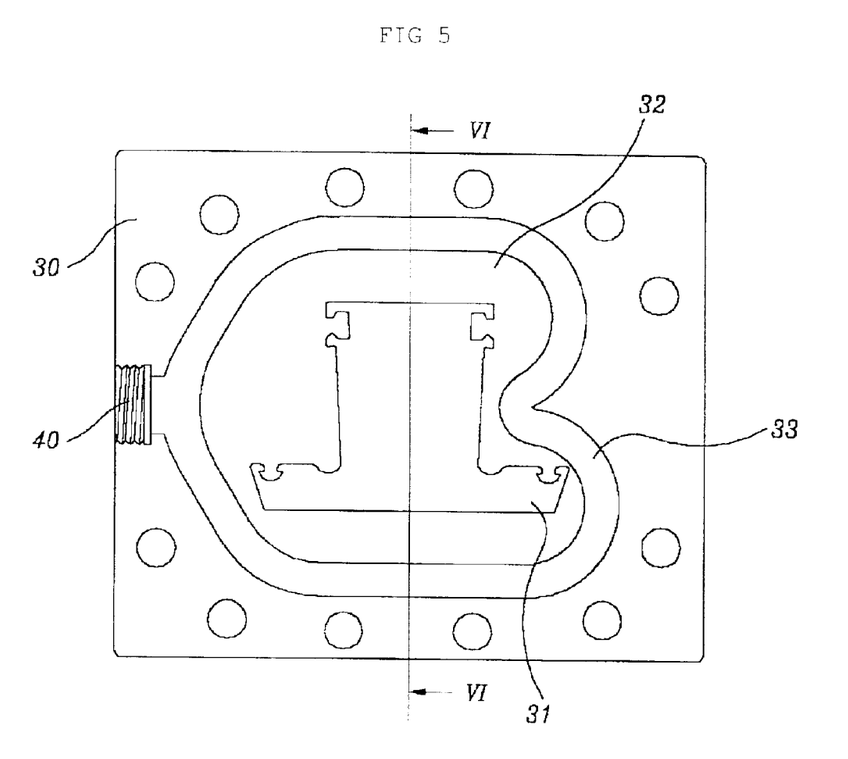
FIG. 5 is a front view of a second molding member which is a part of the extrusion molding die according to the present invention.
Figure 6:
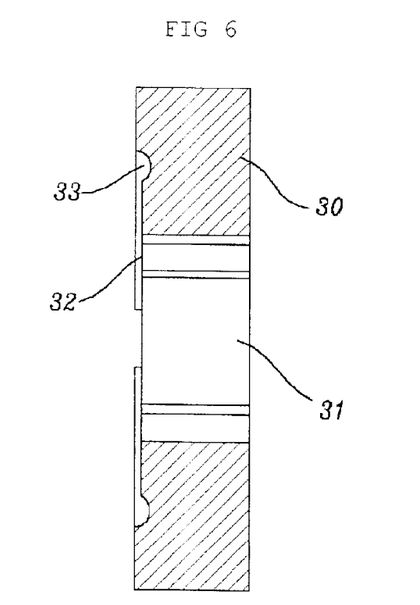
FIG. 6 is a sectional view taken along line IV—IV of FIG. 3.

As shown in FIGS. 2 to 4, an extrusion molding apparatus for manufacturing the aforementioned product 1 includes a first extruder 100, a die 10 installed at an outlet of the first extruder 100, and a second extruder 200 installed at a side of the die 10.

The first extruder 100 has the same configuration as that of a general extruder. That is, the first extruder 100 includes a heat cylinder 101 provided with a heater 102 on an outer surface, a hopper 103 for supplying a first thermoplastic synthetic resin to an inner portion of the heat cylinder 101, a screw 104 for extruding the first synthetic resin softened by heat in the heat cylinder 101 to the die 10 by rotation, and a driver 110 for driving the screw 104.

Likewise, the second extruder 200 has the same configuration as that of a general extruder. The second extruder 200 includes a heat cylinder 201 provided with a heater 202, a hopper 203, a screw (not shown), and a driver 210. The hopper 203 is supplied with a second synthetic resin which contains a wood powder of 80~120 meshes to form a wood pattern 1a on a surface of the product 1 to be extruded.

The die 10 connected with the first and second extruders 100 and 200, as shown in FIGS. 4 to 10, includes first synthetic resin passages 21 and 31 for extruding the first synthetic resin. The second extruder 200 is connected between two moldings 20 and 30 coupled to each other at the foremost among a plurality of moldings constituting the die 10. The second synthetic resin is fed between the two moldings and then is extruded along a passage formed to communicate with the first synthetic resin passages 21 and 31. Since the second synthetic resin passage is extruded around the first synthetic resin passages 21 and 31 by the above structure, the second synthetic resin is coated on the first synthetic resin passages 21 and 31 constituting the product 1. Since the second synthetic resin contains a wood power of 80~120 meshes, a wood pattern 1a is formed on a surface of the product 1.

The wood pattern 1a is distinctly formed on the surface of the product 1 by the two moldings 20 and 30 at the end among the moldings of the die 10. That is, a connecting passage 40 is formed between the second molding member 20 at the end of the die 10 and the first molding member 30 next to the second molding member 20. The second synthetic resin containing a wood powder formed by grinding wood is fed to the connecting passage 40. The connecting passage 40 is connected with the second extruder 200. The second synthetic resin which passed through the connecting rod 40 moves to the synthetic resin passages 21 and 31 along a passage formed inside the first and second molding members 20 and 30 and is coated on the surface of the synthetic resin extruded by pressure of the first extruder.

The first molding member 30, as shown in FIGS. 4 to 6 and FIG. 9, includes half of the connecting passage 40 having a screw for connecting to the second extruder. The synthetic resin passage 31 is formed inside the first molding member 30, and a slit surface 32 is formed around the synthetic resin passage 31 at a height lower than a surface of the first molding member 30 so that the second synthetic resin flows to the synthetic resin passage 31. A retainer groove 30 connected to the connecting passage 40 is formed around the slit surface 32. The retainer groove 33 is lower then the slit surface 32. Therefore, after the second synthetic resin is completely filled in the retainer groove 33, it passes through the slit surface 32 toward the synthetic resin passage 31 by pressure of the second synthetic resin and then extruded through the whole surface.

Figure 7:
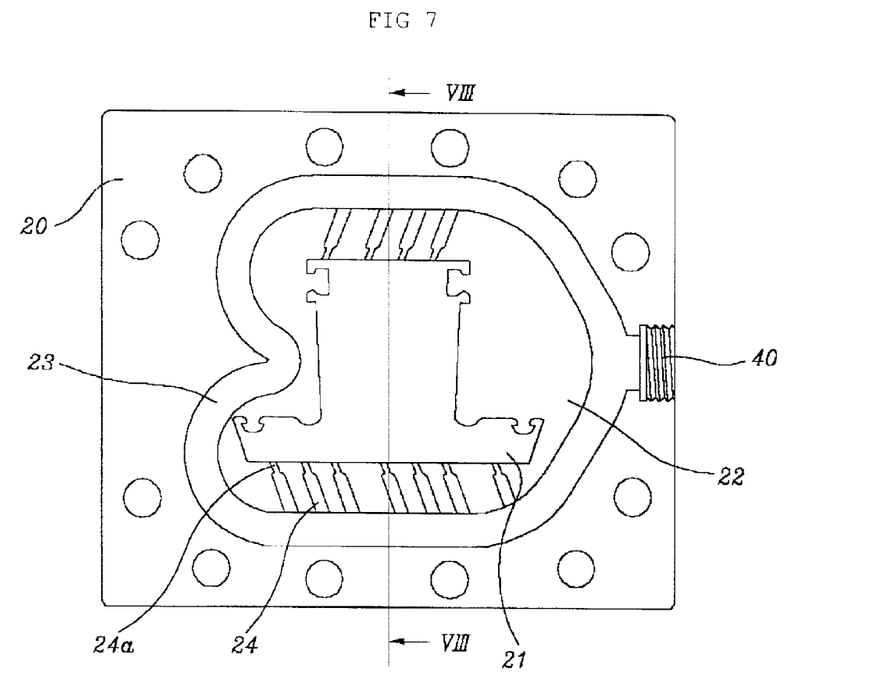
FIG. 7 is a front view of a first molding member which is a part of the extrusion molding die according to the present invention.
Figure 8:
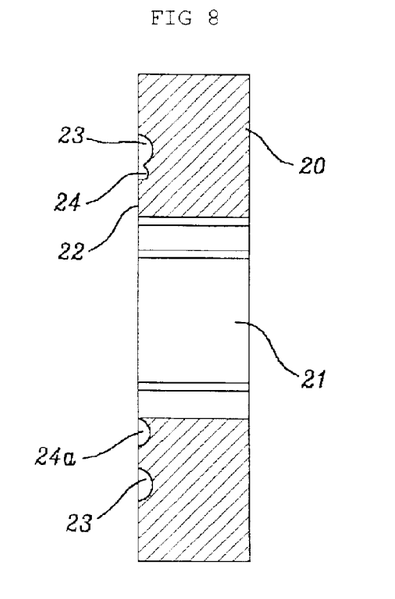
FIG. 8 is a sectional view taken along line VI—VI of FIG. 5.
Figure 9:
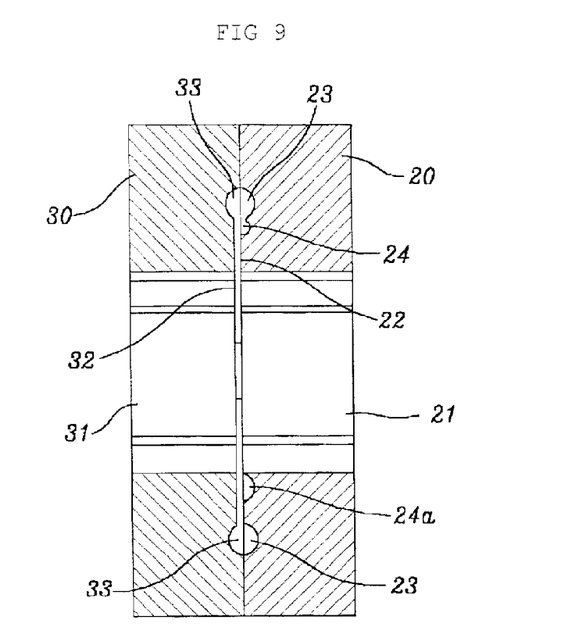
FIG. 9 is a sectional view taken along middle portions of the first and second molding members, illustrating combination of FIG. 4 and FIG. 6.

The second molding member 20, as shown in FIG. 4, and FIGS. 7 to 9, is symmetrically formed to engage with the first molding member 30. Half of the connecting passage 40 having a screw for connecting with the second extruder is formed in the second molding member 20 so that the complete connecting passage 40 is formed together with the connecting passage 40 formed in the first molding member 30. In the same manner as the first molding member 30, the synthetic resin passage 21 is formed in the second molding member 20. A lead surface 22 is formed around the synthetic resin passage 21 together with the slit surface 32, thereby forming a space where the second synthetic resin flows. A retainer groove 23 connected to the retainer groove 33 of the first molding member 30 is formed around the lead surface 22. Particularly, the second molding member 20, as shown in FIGS. 7 to 9, includes a plurality of nozzle grooves 24 formed with a curved section, which is higher than the retainer groove 23 but lower than the lead surface 22, between the retainer groove 23 and the synthetic resin passage 21. Each of the nozzle grooves 24 includes a distal end 24a supplied with the second synthetic resin at a greater amount than that supplied to any other portions, thereby forming a wood pattern. The distal end 24a has a sectional area smaller than that of any other portions to serve as a nozzle. The nozzle grooves 24 are inclined at a predetermined angle along an incoming direction of the second synthetic resin so that the second synthetic resin readily moves to the nozzle grooves 24 through the retainer groove 23.

The retainer grooves 23 and 33 of the first and second molding members 20 and 30, as shown in FIG. 9, are formed to surround the synthetic resin passages 21 and 31 and have a curved section with a predetermined gradient.

FIG. 9 is a sectional view illustrating a coupling state of the first and second molding members 20 and 30. As shown in FIG. 9, the second synthetic resin is introduced into the retainer grooves 23 and 33 through the connecting passage 40 and then moves to the synthetic resin passages 21 and 31 through the space between the slit surface 32 and the lead surface 22. Particularly, as shown in FIG. 7, since the portion where the nozzle grooves 24 are formed has a greater passage area than any other portions, the second synthetic resin moves at a greater amount, thereby resulting in that a wood pattern 1a is formed on the surface of the product 1.

The operation of the aforementioned extrusion molding apparatus will now be described based on the flow of the first and second synthetic resins.

First, the first synthetic resin, as shown in FIGS. 2 and 3, is fed to the first extruder 101 through the hopper 103 and moves to the die 10 by pressure of the rotating screw 104. At this time, the first synthetic resin moves while being softened by the heater 102. The first synthetic resin moved to the die 10 by the screw 104 is extruded in accordance with shapes of the first synthetic resin passages 21 and 31 formed in the die 10, so that the product 1 is successively produced.

The aforementioned extrusion method is the same as the operation of the typical extrusion molding apparatus. In addition to the above method, in the present invention, the second synthetic resin containing a wood powder of 80~120 meshes, as shown in FIGS. 2 and 3, is fed to the second extruder 200 through the hopper 203 and moves through the screw and the second passage 40 formed at a side of the die 10 while being softened by the heater 202. The second synthetic resin introduced into the side between the first and second molding members 20 and 30, as shown in FIG. 9, is introduced around the first synthetic resin passages 21 and 31 through the space formed by the retainer grooves 23 and 33 of the first and second molding members 20 and 30. At this time, the second synthetic resin is also introduced into the space formed by the nozzle grooves 24 and the slit surface 32. Afterwards, the second synthetic resin is fed to the distal end 24a of the nozzle groove 24 and at the same time moves to the surface of the first synthetic resin extruded through the space formed by the slit surface 32 and the lead surface 22. Therefore, the first synthetic resin is coated with the second synthetic resin. At this time, since the second synthetic resin extruded through the nozzle grooves 24 has a greater amount, the wood pattern 1a is formed on the surface of the product 1.

The operation of the first and second molding members 20 and 30 will be described in more detail.

Figure 10:
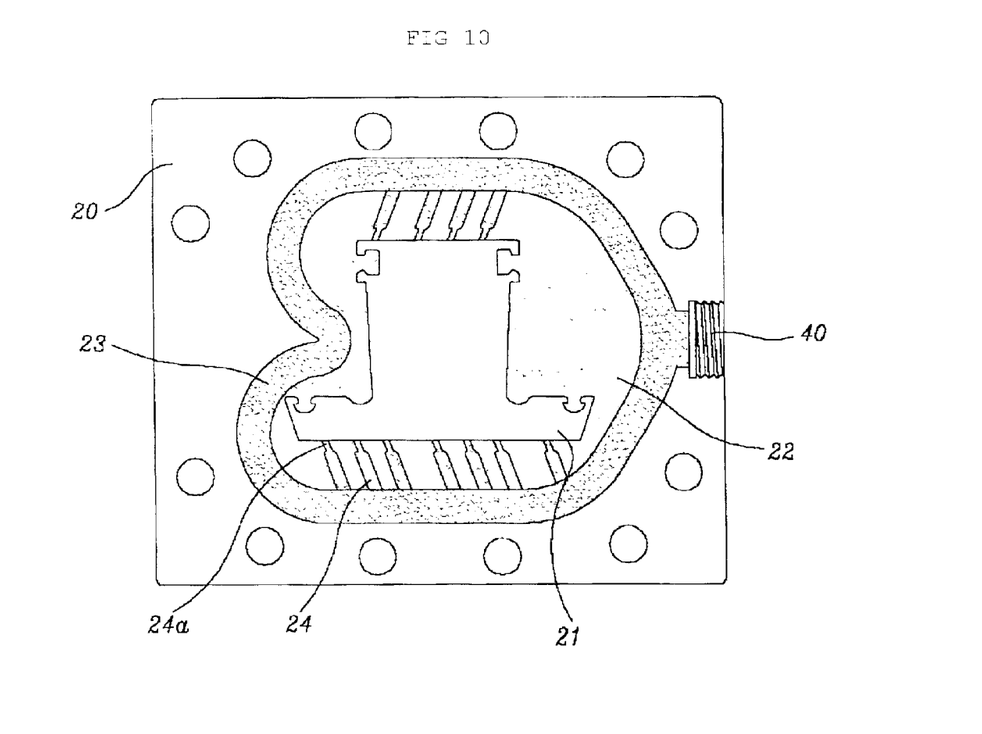
FIG. 10 is a front view of a first molding member which is a part of the extrusion molding die according to the present invention, illustrating a feeding state of a second synthetic resin.

The second extruder is connected to the first and second molding members 20 and 30 through the connecting passage 40 so that the second synthetic resin containing a wood powder is fed to the first and second molding members 20 and 30. The second synthetic resin, as shown in FIG. 9, is fed to the retainer grooves 23 and 33 of the first and second molding members 20 and 30. At this time, the nozzle grooves 24 are inclined at a predetermined angle along a flow of the second synthetic resin introduced into the retainer grooves 23 and 33. Accordingly, the second synthetic resin is also fed to the nozzle grooves 24. Once the second synthetic resin is fully filled in the retainer grooves 23 and 33, the second synthetic resin moves to the whole surface of the synthetic resin passages 21 and 31 through the space, which is formed by the slit surface 32 and the lead surface 22, by the pressure of the second extruder. As a result, the synthetic resin moving through the whole surface of the synthetic resin passages 21 and 31 is coated with the second synthetic resin. At this time, since the second synthetic resin moves to the space formed by the nozzle grooves 24 and the slit surface 32 at a greater amount, the wood pattern 1a is formed on the surface of the product 1. That is, as shown in FIG. 10, the wood pattern 1a is formed on lower and upper surfaces of the product 1.

The second synthetic resin contains a wood powder obtained by grinding wood as described above. However, the second synthetic resin may be formed of other materials as the case may be.

Furthermore, the retainer grooves 23 and 33 are formed to surround the synthetic resin passages 21 and 31 so that the whole surface of the synthetic resin is equally coated with the second synthetic resin. That is, at a portion close to the connecting passage 40 supplied with the second synthetic resin, the retainer grooves 23 and 33 are formed far away from the synthetic resin passages 21 and 31. By contrast, at a portion far away from the connecting passage 40, the retainer grooves 23 and 33 are formed close to the synthetic resin passages 21 and 31. Also, it should be noted that the retainer grooves 23 and 33 are bent depending on sectional shapes of the synthetic resin passages 21 and 31.

Furthermore, even if a molding member is designed by considering various cases, the second synthetic resin is introduced into the synthetic resin passages 21 and 31 at different ratios depending on position. In this case, some wood pattern may naturally be formed. However, in the present invention, since the nozzle grooves 24 are formed, accurate wood pattern can artificially be formed.

As described above, the extrusion molding apparatus for a product having a wood pattern and the extrusion molding method according to the present invention have the following advantages.

Since the product having a wood pattern is formed by the first and second synthetic resins, the wood pattern is not taken off and esthetic appearance can be obtained.

In addition, the finished product is manufactured by one time process, and no process of wrapping a sheet paper of a wood pattern is required. This reduces the process steps and thus enhances the productivity.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An extrusion molding apparatus, comprising:
   an extruder extruding product formed from thermoplastic synthetic resin through a die, which is installed at an outlet of the extruder, the die having a first portion with a groove and a second portion with a corresponding groove to form a passageway, a second inlet being formed at one side of the die in communication with the passageway to feed a second synthetic resin from a second extruder through the second inlet, wherein the passageway communicates with an original synthetic resin passage formed in the die such that the second synthetic resin coats a surface of the product extruded from the die.

2. The extrusion molding apparatus of claim 1, wherein the-passageway is in communication with a second passageway-of the die formed to communicate with the original synthetic resin passage so that the whole surface of the product is coated with the second synthetic resin and a sectional area of the second passage is irregularly formed.

3. An extrusion molding die, comprising:
   a die installed at an outlet of an extruder including;
   a synthetic resin passage provided at one side of the die to receive synthetic resin from the extruder;
   a second inlet formed at another side of the die to feed a second synthetic resin thereto, a second passage in communication with the synthetic resin passage and with the second inlet to coat the second synthetic resin on a surface of a product extruded from the die; and a plurality of nozzle grooves in communication with the second passage so that the second synthetic resin of a predetermined ratio covers a surface of the product.

4. The extrusion molding die of claim 3, wherein the second passage is formed around the synthetic resin passage so that the whole surface of the product is coated with the second synthetic resin.

5. The extrusion molding die of claim 4, wherein the plurality of nozzle grooves in communication with the second passage covers the whole surface of the product.

6. The extrusion molding die of claim 5, wherein the plurality of nozzle grooves are in communication with the second inlet so that the second synthetic resin is introduced into the second passage at a substantially constant pressure.

7. The extrusion molding die of claim 5, wherein the plurality of nozzle grooves have a smaller sectional area than a sectional area of the second passage and the plurality of nozzle grooves have one end in communication with the second passage and the other end in communication with the synthetic resin passage.

8. The extrusion molding die of claim 7, wherein the plurality of nozzle grooves have a curved section.

9. The extrusion molding die of claim 7, wherein the plurality of nozzle grooves have a sectional area which is gradually reduced toward the synthetic resin passage.

10. The extrusion molding die of claim 7, wherein the plurality of nozzle grooves are is inclined at a predetermined angle along a flow path of the second synthetic resin.

11. An extrusion molding apparatus, comprising:

a die;

a first extruder connected to a portion of the die;

a second extruder connected to another portion of the die;

a first synthetic resin passage formed through the die;

an inlet passage formed in a portion of the die for receiving a second synthetic resin from the second extruder;

a retainer groove in fluid communication with the inlet passage and formed in a portion of the die; and a plurality of nozzle grooves in fluid communication with the retainer groove and the first synthetic resin passage, wherein the first synthetic resin passage is arranged in an inner circumference portion of the retainer groove.

12. The extrusion molding apparatus of claim 11, wherein the die further comprises:

a first molding member including a first partial inlet passage; and a second molding member arranged adjacent to the first molding member including a second partial inlet passage, wherein the first partial inlet passage and second partial inlet passage are arranged together to form the inlet passage that is in fluid communication with the second extruder and the retainer groove.

13. The extrusion molding apparatus of claim 12, further comprising:

a plurality of nozzle grooves in fluid communication with the retainer groove and a first synthetic resin passage, wherein the first synthetic resin passage is arranged in an inner circumference portion of the retainer groove.

14. The extrusion molding apparatus of claim 13, wherein the retainer groove is formed substantially around a circumference of the first synthetic resin passage so that the whole surface of a product is coated with a second synthetic resin.

15. The extrusion molding apparatus of claim 13, wherein the plurality of nozzle grooves are in fluid communication with the retainer groove so that the second synthetic resin of a predetermined ratio covers the whole surface of the product.

16. The extrusion molding apparatus of claim 13, wherein the retainer groove is in fluid communication with the inlet passage so that the second synthetic resin introduced into the retainer groove is at a substantially constant pressure.

17. The extrusion molding apparatus of claim 14, wherein the plurality of nozzle grooves have a smaller sectional area than a sectional area of the retainer groove, the plurality of nozzle grooves have a first end connected to the retainer groove and a second end connected to the synthetic resin passage.

18. The extrusion molding apparatus of claim 17, wherein the retainer groove and the plurality of nozzle grooves have a curved section.

19. The extrusion molding apparatus of claim 11, wherein the plurality of nozzle grooves have a sectional area which is gradually reduced toward the synthetic resin passage.

* * * * *